Jan. 3, 1939. C. D. WALLACH 2,142,542
THERMAL INSULATION FOR PIPES AND THE LIKE
Filed July 17, 1935 2 Sheets-Sheet 2

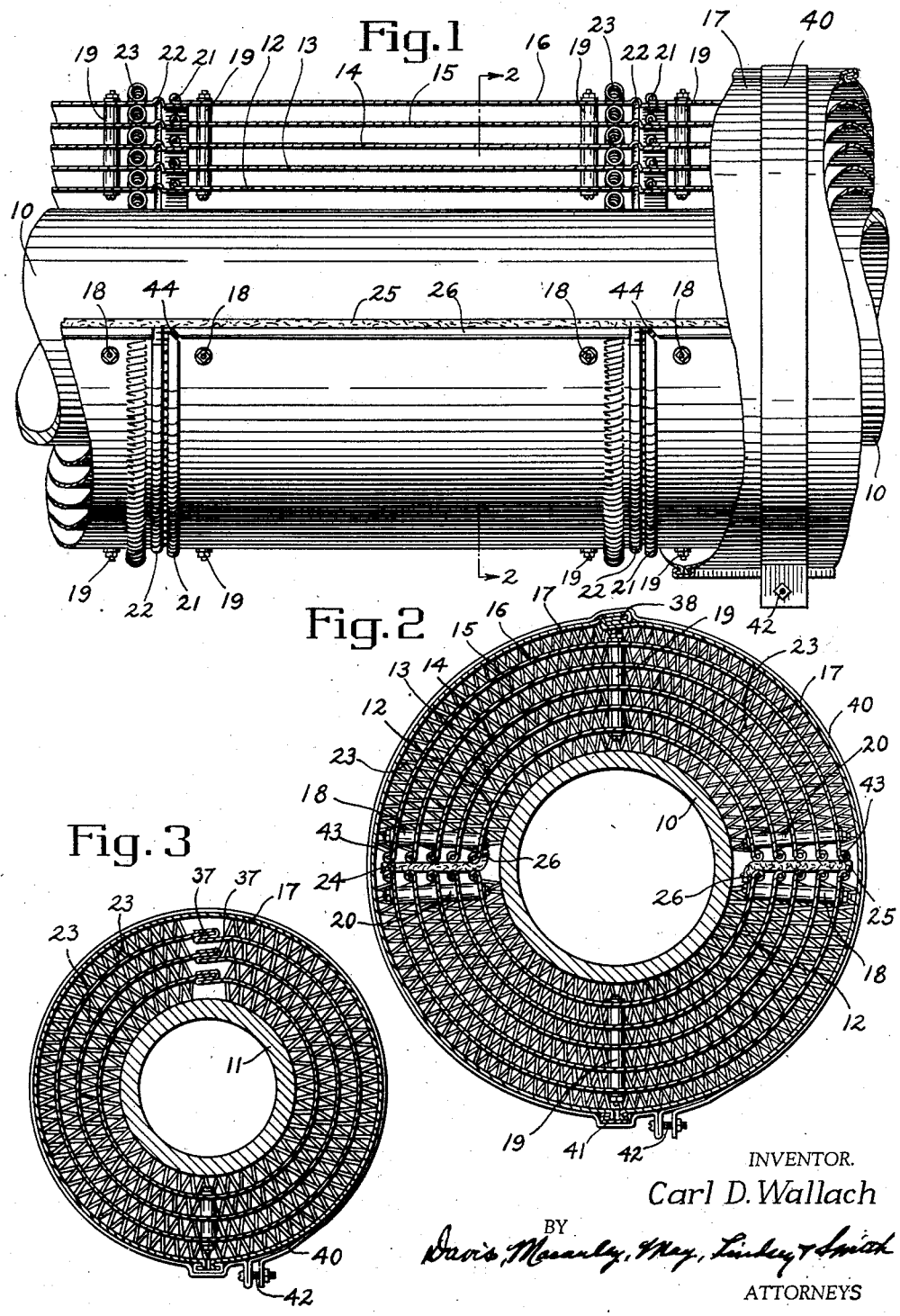

INVENTOR.
Carl D. Wallach
BY
ATTORNEYS

Patented Jan. 3, 1939

2,142,542

UNITED STATES PATENT OFFICE

2,142,542

THERMAL INSULATION FOR PIPES AND THE LIKE

Carl D. Wallach, Newburgh, N. Y., assignor, by mesne assignments, to American Flange & Manufacturing Co., Inc., New York, N. Y., a corporation of Illinois Application July 17, 1935, Serial No. 31,749

10 Claims. (Cl. 154—45)

This invention relates to thermal insulation, and more especially to a method and means for thermally-insulating a tubular or cylindrical structure, such as a pipe or tank, against the passage of heat or cold from within or without.

An object of the invention is to provide thermal insulation formed from sheet metal and adapted to be readily fabricated to cover a pipe or other container, and provide one or more continuous or separated air spaces around said container.

Another object is to provide an all-metal heat-and-cold insulating means for structures which are non-uni-planar in shape, of a character adapted to provide near-maximum insulation efficiency and which is exceptionally simple in construction, is inexpensive to manufacture, is readily adaptable with ease to practically every form and size of pipe, tank, drum, or other curved-surface object where heat-and-cold insulation is desired, is strong and durable, is of low specific heat, is fireproof, is not affected by moisture and vapor, and is proof against vermin, insects, rodents, bacteria and various gases.

Another object is to provide thermal insulation of this character wherein the material surface is of such a character that a high degree of reflectivity against the passage of heat rays through the insulated structure is obtained.

Another object is to thermally-insulate a pipe or other object by means of pre-fabricated spaced covering members utilizing the closed and separated air spaces therebetween and also the high reflectivity to heat rays of the material of said members, to obtain a maximum of insulation effect.

Another object is to provide a thermally-insulating covering material for piping and the like, said material having a relatively hard surface, such as that of commercial black steel, a dull-satin or non-reflecting finish—such as that of a tin and lead alloy somewhat like pewter, and which surface will have relatively high reflectivity to the passage of heat rays, and relatively low reflectivity to the passage of light rays, reducing to the minimum the transfer of heat or cold by conduction, convection, and radiation.

A further object is to provide means for thermally-insulating the end sections of adjacent air spaces formed in the above manner.

Another object is to provide spacing means for a plurality of thermally-insulating members nested one within another.

A still further object is to provide means formed on the insulating sheets for holding the spacing means against longitudinal displacement.

A still further object is to provide fastening means for the ends of resilient spacing means for attaching their ends together or to the insulating members.

All these and other objects as suggested herebelow are attained by the method and means now to be described, and illustrated in the accompanying drawings, in which—

Figure 1 is a vertical elevational view, partly cut away and in section, showing a preferred embodiment of the insulation structure of this invention applied to a cylindrical object such as a pipe.

Fig. 2 is a transverse sectional view through the line 2—2 of Fig. 1.

Fig. 3 is a sectional view similar to that of Fig. 2 but showing the insulating structure of this invention applied to a somewhat smaller pipe and eliminating the closure means at the end of adjacent sections or portions of each concentric air space.

Figure 6:
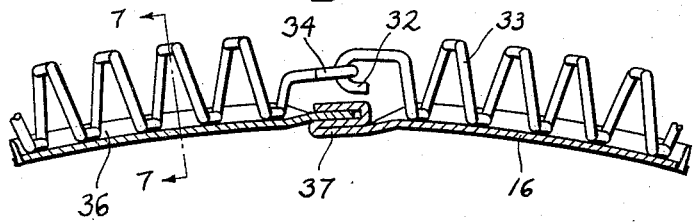
Fig. 6 is a similar view of a modified form of spacing means having line contact with the surface of the insulating sheet and showing a form of fastening the ends of the spacing means together around the insulating sheet and which requires no attachment to said sheet.
Figure 7:
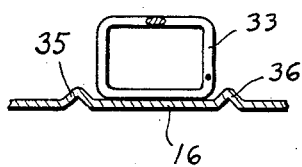

And Fig. 7 is a fragmentary lateral cross-sectional view through an insulating sheet, on the line 7—7 of Fig. 6, showing the separating member largely in end elevation, and a means on the insulating sheet for retaining said member against longitudinal displacement.

Like numerals refer to like parts throughout the several views.

This invention is shown applied to a curved or continuous-surfaced object such as a pipe 10, of somewhat larger size, or a pipe 11, of somewhat smaller size, both said pipes being adapted to convey a heated medium such as steam or a refrigerated medium such as cold air, or other fluids such as refrigerants.

The insulating structure adapted to surround pipe 10, for instance, consists essentially of a plurality of spaced thin metal sheets 12, 13, 14, 15, and 16, concentrically positioned within a cylindrical metallic covering member 17, which member 17 may be galvanized or otherwise protected from corrosion. Member 17 is preferably of heavier sheet material than the insulating members 12 to 16 inclusive. These last-named members are made of a material such as commercial black steel which has a high degree of reflectivity to the passage of heat rays therethrough. This quality of the material, coupled with the separated air spaces between each material wall are together held to be responsible for the high insulating value of the construction. The steel is usually coated with an alloy of about three-quarters lead and one-quarter tin.

Members 12 to 16 inclusive are preferably spaced at comparatively small distances apart, it having been found, for instance, that in many installations a spacing of about ½ inch or less gave the best results.

The material from which members 12 to 16 inclusive is formed is flat sheet metal bent into substantially circular or semi-circular cross-sections of varying diameters, as suggested in the drawings.

The various concentric insulating sheets illustrated in Figs. 1 and 2, and numbered 12 to 16 inclusive, are actually made in semi-circular form and are assembled together and held by means of pairs of combined fastening and spacing members 18, 19, and 20. These members comprise a nut and bolt construction passing through aligned holes in the several sheet members and passing through a plurality of ferrules positioned between the sheets to serve as spacing means. Members 18, 19, and 20 are preferably made either entirely of insulating material or they may contain such material in the ferrules or elsewhere in their construction in manner to insulate each insulating sheet from the others.

The thermally-insulating sheets 12 to 16 inclusive have their companion ends at one end curled up to form a bead 21, Fig. 1, and their companion ends at the opposite end left straight to make frictional and substantially air-tight engagement beneath the beaded ends of the adjacent end sections, as clearly shown in the drawings. Also, immediately back of the uncurled end of the sheets are formed circular or V-shaped embossed shoulders 22 for the purpose of strengthening the ends of the sheets and also to provide a stop for the companion beaded ends 21 of said insulating sheets. It will be noted that there is a space shown between the ends 21 of one set of insulating sheets and the shoulders 22 of the other set, this being for the purpose of allowing for expansion and contraction of the fitted parts due to temperature changes. Embossed shoulders 22 also serve to prevent longitudinal displacement in that direction of the spacing members 23, these members 23 being prevented from longitudinal displacement in the opposite direction by means of the combined fastening and spacing members 18, 19, and 20.

Spacing members 23 are preferably formed of a resilient material such as stainless steel, which has a lower conductivity co-efficient than ordinarily spring steel. It may of course be formed of any suitable material, preferably one which has the highest heat insulating quality and yet serves the structural function needed. These members 23 are sections of spiral spring which may be extended lengthwise, and are resilient and somewhat compressible across their sections to form frictional contact with the insulating sheets.

Figure 4:
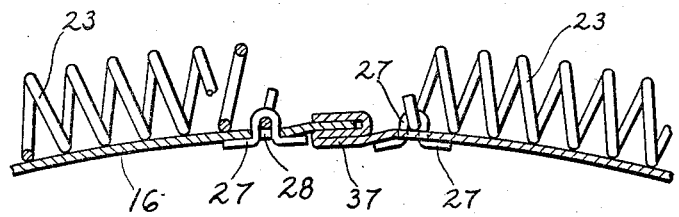
Fig. 4 is a side elevational view, partly cut away to show one form of the resilient spacing means and its method of attachment to the insulating member or sheet which it surrounds.
Figure 5:
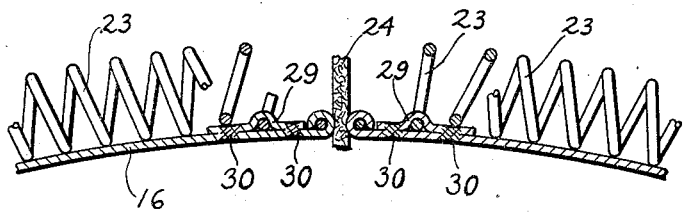
Fig. 5 is a view of the spacing means shown in Fig. 4 but disclosing a modified form of attachment of the spacing means to the said insulating sheet.

Spiral spacing members 23 may be circular in cross-section, as shown in Figs. 4 and 5, or rectangular-shaped, as shown in Figs. 6 and 7, or other appropriate shape.

In the former instance there is only point contact between the spacer and the sheet surfaces at each spring coil, thus reducing the heat-conducting path to the minimum, but providing less frictional engagement against longitudinal displacement; whereas the form of spring shown in Figs. 6 and 7 provide line contact which, while increasing the conducting path slightly, has the practical overriding advantages of providing greater frictional engagement of the spacing member to resist longitudinal displacement, and providing a more rigid support between adjacent insulating sheets.

It will be understood that the thermal-insulating sheet assembly, as illustrated in the embodiment shown in Figs. 1 and 2, consisting of five concentrically-spaced sheet members with six spacing members, has each sheet member formed in two half-portions which are later assembled together around the pipe to be insulated, and then the continuous covering 20 is positioned to surround the whole. To this end insulating members 24, 25 preferably formed from sheet asbestos, are attached at 26, 26 to oppositely-disposed ends of the inner sheet half members, 12, 12, so that one half-section carries member 24 and the other half-section carries member 25. This fastening may be by use of ordinary staples, the members 24 and 25 extending longitudinally over the entire length of the insulating sheet assembly and in contact with the ends of all five sheet members. By this construction leakage is prevented from the air space between one adjacent pair of insulating sheet members to any other air space, and also to divide each concentric air space into two entirely separate portions. This eliminates losses through convection currents going entirely around the insulating structure, and confines any heat flow to a half-portion thereof.

The longitudinally-disposed edges of insulating members 12 to 16 inclusive are outwardly curled in manner as shown at 43, Fig. 2, to encompass a strengthening wire 44, Fig. 1, which extends along the curl 43 and down and around the sheet member within bead 21, for instance. This provides a simple means for giving the effect of a continuous and strong bead around the reinforced end and along both longitudinal edges of each half-section of sheet insulation.

The spacing members 23, Figs. 4 and 5, are preferably fastened at their ends to the insulating sheet about which they are coiled by being hooked beneath a U-shaped clip 27, Fig. 4, which passes through a hole 28 in insulating member 16, for instance; or a slightly modified form of clip 29, Fig. 5, may be employed by welding it at 30, 30 to the surface of sheet 16. Or particularly when used in the form of assembly shown in Fig. 3, and whether used with the rectangular cross-section spring or the circular or other cross-section spring, the connection shown in Fig. 6 may be employed. This consists of a loop 32 bent downwardly in a vertical direction from one end of spacer 33 and a horizontal bent loop 34 at the other end of this spacer, these being hooked together, preferably over the lap joint of sheet 16.

Where the rectangular sectional spacer 33, Fig. 7, is used it is preferable to retain this against longitudinal displacement on the insulating sheet 16 by means of upwardly embossed ribs or shoulders 35, 36 in parallel spaced relation sufficiently apart to permit member 33 to lie between and be retained by said shoulders.

In the construction shown in Fig. 3, which is most adaptable for use with pipes of somewhat smaller diameter, the sheet insulation members, instead of being assembled in half-portion, may extend continuously around the pipe as shown, and have their ends affixed together by a suitable joint such as that shown enlarged at 37, Figs. 4 and 6. This joint consists in doubling one one of the sheet back upon itself for a short distance and then reversing the bend to form a U-shaped opening into which the opposite sheet-end is positioned to make frictional engagement between the sheet-ends and so retain the form of a complete circle of material. It will be noted that the end of the sheet to the left, as shown in Fig. 6, does not fully enter the opening formed by the joint on the sheet to the right thereof. The space thus provided permits expansion due to heat changes and also slight changes in the diameter of the sheet member to conform with irregularities in the manufacture of adjacent and surrounding parts.

An advantage of the hook spring spacer construction shown in Fig. 6 is that the outermost spacing member of the complete assemblage tends to hold the assembled elements spaced within it in proper assembled relation. It also permits easy assembly since the innermost spring spacer can be hooked around the pipe first, then the innermost sheet member positioned around that, then the next spacing member hooked around that and so on until the complete assemblage is formed.

The lap joint 38, Fig. 2, is of conventional character to permit the narrowest possible sheets 17 of outer covering material to be tied together so that they will surround the entire circumference of the insulated structure. This covering member 17 is made of somewhat heavier metal and is essentially used for its structural and protective value over the assemblage. It is positioned around the thermally-insulated pipe either from its end or by flexing the cover's ends outwardly and then positioning it laterally over the pipe assemblage and then bringing the ends together at the bottom as viewed in Fig. 2 and holding them in engagement in any well-known manner such as by means of the connector as shown at 41, Fig. 2. This connector is not shown in detail as it forms no part of this invention. After the covering 17 is thus assembled, strap 40 is positioned around the complete covering and its flanged ends connected as by a suitable bolt 42.

It is to be understood that the present disclosure is for the purpose of illustration only, and that the invention is not limited thereto. To those skilled in the art, many modifications of the invention will be readily apparent, and it will also be obvious to such skilled persons that parts of the device and method may be used without other parts thereof, many such combinations readily suggesting themselves. Therefore, it should be, and is to be distinctly understood that for a definition of the limitations of the invention, reference must be had to the appended claims.

Having now described the invention, what is claimed as new and for which Letters Patent of the United States is desired, is:

1. In combination a pipe and thermal-insulation means therearound, said means comprising a cover member and a metallic thermal-insulation member spaced between the pipe and the cover member and forming a plurality of disconnected spaces therewith, including spiral springs around the pipe and the metallic member to space the metallic member and the cover member respectively therefrom, there being parallel spaced projections on the metallic member on each side of its spring to prevent longitudinal displacement of the spring.

2. In combination a pipe and thermal-insulation means therearound, said means comprising a cover member and a metallic thermal-insulation member spaced between the pipe and the cover member and forming a plurality of disconnected spaces therewith, including spiral springs around the pipe and the metallic member to space the metallic member and the cover member respectively therefrom, said springs having their upper and lower contacting portions parallel to make line contact with the contacting surfaces of the members so spaced.

3. In combination a pipe and thermal-insulation means therearound, said means comprising a cover member and a metallic thermal-insulation member spaced between the pipe and the cover member and forming a plurality of disconnected spaces therewith, including spiral springs around the pipe and the metallic member to space the metallic member and the cover member respectively therefrom, said metallic member being formed of a flat sheet bent into a continuous section with its ends jointed together and the springs surrounding said member having their ends removably fastened to said member on either side of said joint.

4. In combination, a substantially cylindrical container, and thermal-insulation means therearound, said means comprising a continuous cover member and a metallic thermal-insulation member spaced between the container and the cover member, said metallic member comprising longitudinally disposed sections connected to each other by a male-and-female, substantially airtight joint, said joint comprising an outwardly flanged bead around the end portion of one section and an outwardly-embossed ridge around the surface and near the adjacent end portion of the companion section and adapted to limit the lap of the end sections when assembled together.

5. In combination, a substantially cylindrical container, and thermal-insulation means therearound, said means comprising a continuous cover member and a metallic thermal-insulation member spaced between the container and the cover member, said metallic member comprising longitudinally disposed sections connected to each other by a male-and-female, substantially airtight joint, there being a plurality of concentric metallic members, each said section thereof comprising at least two laterally disposed portions having their ends curled outwardly and separated by a compressible insulating plate member adapted to engage the metallic members and separate the air spaces therebetween one from another.

6. Thermal-insulation for a pipe or tank comprising layers of metallic material in spaced relation therearound following the contour thereof and forming isolated air spaces, each of said layers being formed of a plurality of sheets along the length of said pipe or tank and of another plurality of sheets around the contour of said pipe or tank to completely encompass the same, said sheets bearing end to end relation one to another, and a continuous cover member spaced from the outermost layer encompassing the same and adapted to retain all said layers in operative position and means for setting said layers in definite curved relation one to another, said means comprising a multiplicity of insulating ferrules retained in position between said layers throughout the circumferential extent thereof to serve as spacers therefor.

7. An insulation unit for bodies with curved surfaces comprising a plurality of thin curved sheets of heat-reflecting material, means for setting said sheets in spaced relationship and means operating between said setting means for maintaining said spaced relationship throughout the curve of said sheets.

8. In readily installed heat insulation construction for a curved member, a series of heat-reflecting units to be installed about said member, each of said units being formed concentrically with respect to said member to form therewith an isolated air space and co-mating means including stop means at the ends of each unit of said series to receive the ends of the adjacent units in airtight relation and position them against substantial longitudinal displacement with respect to each other.

9. Thermal-insulation for a pipe or tank comprising layers of metallic material in spaced relation therearound following the contour thereof and forming isolated air spaces, each of said layers being formed of a plurality of sheets along the length of said pipe or tank and of another plurality of sheets around the contour of said pipe or tank to completely encompass the same, said sheets bearing end-to-end relation one to another, one end of each of said sheets being formed to receive the opposed end of the sheet adjacent to it in limited slidable relation with respect thereto and the end of said adjacent sheet being formed to readily and slidably engage the end of said first sheet and maintain substantially airtight relation with respect thereto, and a continuous cover member spaced from the outermost layer encompassing the same and adapted to retain all said layers in operative position.

10. In combination, a pipe and thermal insulation means therearound, said means comprising a cover member and a metallic thermal insulation member spaced between the pipe and the cover member and forming a plurality of disconnected spaces therewith, including spiral springs around the pipe and the metallic member to space the metallic member and the cover member respectively therefrom and means on opposed sides of the springs to maintain the same in selected position.

CARL D. WALLACH.